United States Patent [19]

Debellian

[11] Patent Number: 5,173,182

[45] Date of Patent: Dec. 22, 1992

[54] MULTI-PURPOSE ENVIRONMENTAL WORK VESSEL

[76] Inventor: Gabriel J. Debellian, 1007 N. America Way, Fifth Floor, Miami, Fla. 33132

[21] Appl. No.: 834,368

[22] Filed: Feb. 12, 1992

[51] Int. Cl.⁵ .............................................. E02B 15/04
[52] U.S. Cl. .................... 210/170; 210/242.1; 210/242.3; 210/251; 210/923; 440/39; 114/270; 37/59
[58] Field of Search ................. 210/170, 242.1, 242.3, 210/242.4, 251, 297, 298, 307, 359, 391, 407, 416.1, 923, 924; 440/39; 114/270; 37/58, 59, 72

[56] References Cited

U.S. PATENT DOCUMENTS

| | | | |
|---|---|---|---|
| 906,234 | 12/1908 | Jackson | 37/58 |
| 3,268,081 | 8/1966 | Menkee et al. | 210/242.1 |
| 3,339,516 | 9/1967 | Linci | 440/39 |
| 3,700,107 | 10/1972 | Flaviani | 210/923 |
| 3,700,108 | 10/1972 | Richards | 210/923 |
| 3,966,613 | 6/1976 | Kirk et al. | 210/923 |
| 4,060,487 | 11/1977 | Samsel | 210/923 |
| 4,141,308 | 2/1979 | Gainy | 210/923 |
| 4,363,735 | 12/1982 | Hook | 210/242.1 |
| 4,854,058 | 8/1989 | Slom et al. | 210/170 |
| 5,043,064 | 8/1991 | Abell et al. | 210/242.1 |

Primary Examiner—Stanley S. Silverman
Assistant Examiner—Christopher Upton
Attorney, Agent, or Firm—Malloy, Downey & Malloy

[57] ABSTRACT

A multi-purpose environmental work vessel, to be used in a variety of waterways, canals, and other coastal areas to perform a variety of necessary tasks including skimming oil or debris from the surface of the water, dredging for debris beneath the water's surface, and assisting in firefighting. The vessel includes a catamaran-type hull having a pivotally positioned trash scoop at a forward end of the hull to scoop debris and unload into an adjacently positioned active trash container, a removably positioned dredging system, a fire monitor, a spinning drum-type oil skimmer, an inboard crane, and a pair of outboard motors to propel the vessel and allow it to run at high speeds at a substantially shallow draft.

17 Claims, 3 Drawing Sheets

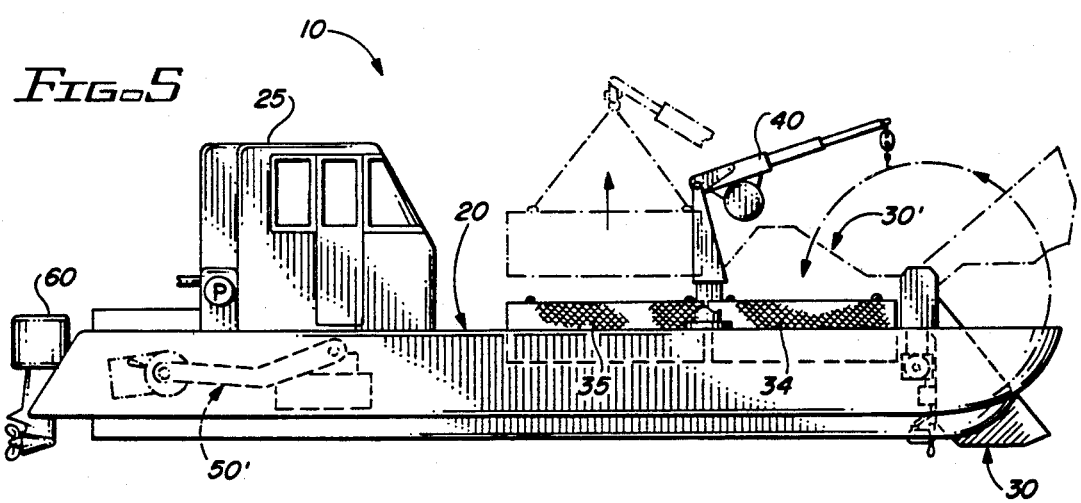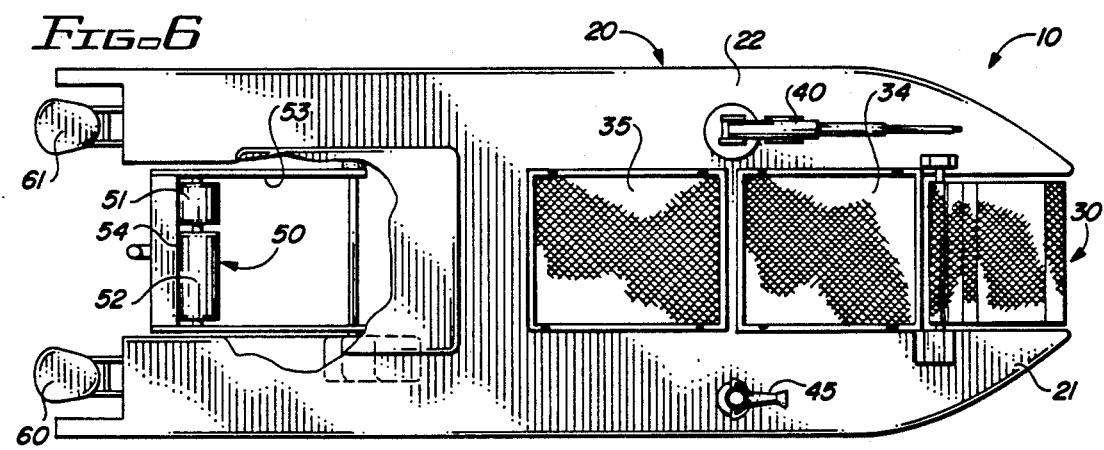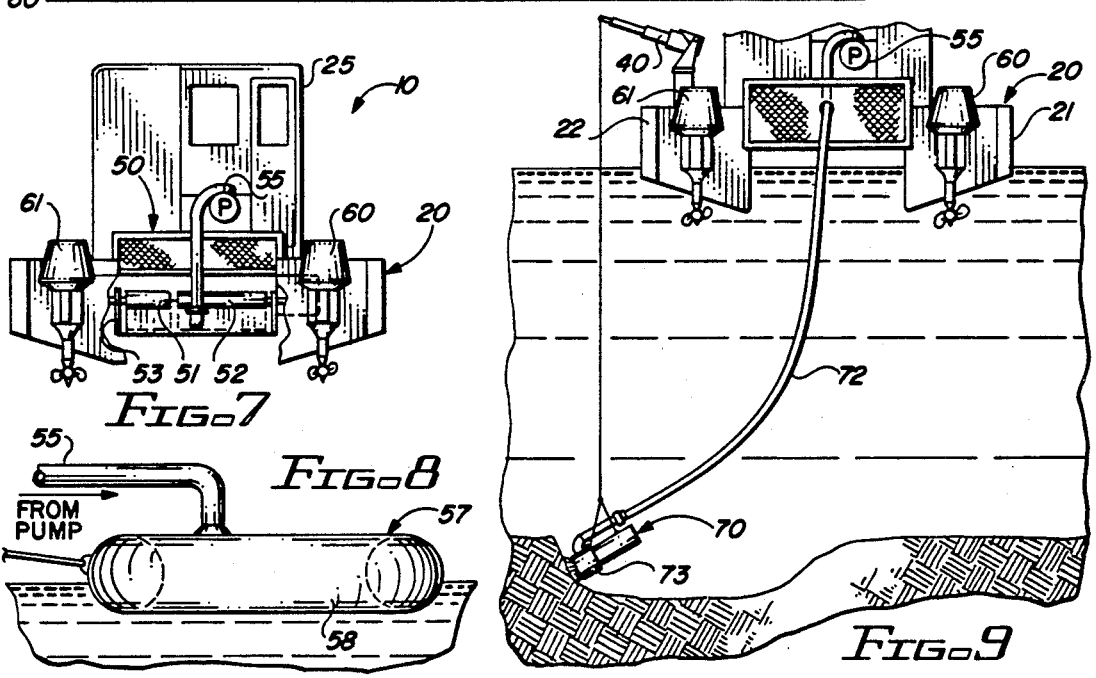

MULTI-PURPOSE ENVIRONMENTAL WORK VESSEL

BACKGROUND OF THE INVENTION

1. Field of the Invention

This invention relates to a multi-purpose, environmental work vessel adapted to be highly maneuverable and functional in a variety of waterways and canals, and providing an effective means for performing a variety of vital tasks, simultaneously or independently, including cleaning the water surface and seat bottom of debris, oil and other pollutants.

2. Description of the Prior Art

In restricted canals and waterways, as well as coastal areas, a variety of environmental hazards which require immediate response often occur. Such hazards include fires, oil spills, the blockage of canals and waterways by debris both at the water's surface and on the floor of the canal or waterway, fires on boats and waterfront facilities, and rescue and salvage operations. Currently, there are independent vessels designed to perform some of these necessary tasks. Unfortunately, due to the design of these vessels and/or the specific area in which they are designed to operate, the vessels cannot be readily used for a variety of purposes, and should a situation occur wherein more than one of such hazards is present, multiple vessels must be used in an attempt to deal with the situation.

Accordingly, applicant's design combines the most necessary and vital functions of emergency and pollution control vessels into a single, adaptable, and maneuverable vessel. Utilizing a vessel which is uniquely structured and designed to enable it to perform a variety of functions in complete compatibility with one another, such as is possible with the applicant's invention, would solve a longstanding problem which slows down the emergency response process.

SUMMARY OF THE INVENTION

The present invention is directed towards a multi-purpose environmental work vessel to be used to quickly and maneuverably respond to a variety of waterway and coastal emergency situations, which are often located in confined locations where maneuverability is limited, and sometimes involve more than one necessary emergency function. The vessel includes a substantially lightweight catamaran-type hull capable of allowing the vessel to run at high speeds and a substantially low draft including a pair of elongate pontoons connected to one another at a rear portion thereof by a deck area. Positioned at a forward end of the hull, and pivotally positioned between the pontoons is a trash scoop structured and disposed to allow the passage of water therethrough while capturing large and small articles of floating debris therein and unloading them into an adjacently positioned active trash container positioned between the pontoons directly behind the trash scoop. Further included as part of the vessel are dredging means for dredging a bottom surface of canals, waterways, and the like for debris and sludge, an inboard crane to assist in a variety of tasks including repositioning of trash containers and maneuvering the dredging means, firefighting means to enable the vessel to assist in extinguishing fires on boats or waterfront facilities, and oil spill cleanup means retractably mounted between the pontoons and the rear of the hull designed to skim oil from the water and pump it to oil holding means.

With the foregoing in mind, it is an object of the present invention to provide a multi-purpose vessel which is adapted to be easily maneuvered so as to allow for a fast response to emergency situations and a rapid rate of cleanup of debris, oil slicks, and other pollutants commonly encountered in busy, heavily congested waterways.

It is another object of the present invention to provide a vessel which may function in relatively shallow areas.

It is yet another object of the present invention to provide a vessel which, by itself, can perform a variety of tasks simultaneously or individually.

It is also an object of the present invention to provide a cost effective vessel which eliminates the need for a variety of specialized vessels.

BRIEF DESCRIPTION OF THE DRAWINGS

For a fuller understanding of the nature of the present invention, reference should be had to the following detailed description taken in connection with the accompanying drawings in which:

FIG. 4 is a side, partial cutaway view of the multi-purpose environmental work vessel.

FIG. 5 is a side view of the multi-purpose environmental work vessel.

FIG. 6 is a top plan view of the multi-purpose environmental work vessel.

FIG. 7 is a detailed rear view of the multi-purpose, environmental work vessel.

FIG. 8 is a detailed view of a preferred embodiment oil holding means.

FIG. 9 is a rear view of the environmental work vessel utilizing dredge means.

Like reference numerals refer to like parts throughout the several views of the drawings.

DETAILED DESCRIPTION OF THE PREFERRED EMBODIMENT

The present invention is directed towards a multi-purpose, environmental work vessel, generally indicated as 10, shown throughout FIGS. 1-4. The work vessel 10 includes primarily a catamaran-type hull 20 which is substantially lightweight and is capable of allowing the vessel 10 to run at high speeds and at a substantially shallow draft. The catamaran-type hull 20 includes a pair of elongate pontoons 21 and 22 disposed in parallel relation and connected at a deck area 24.

Figure 1:
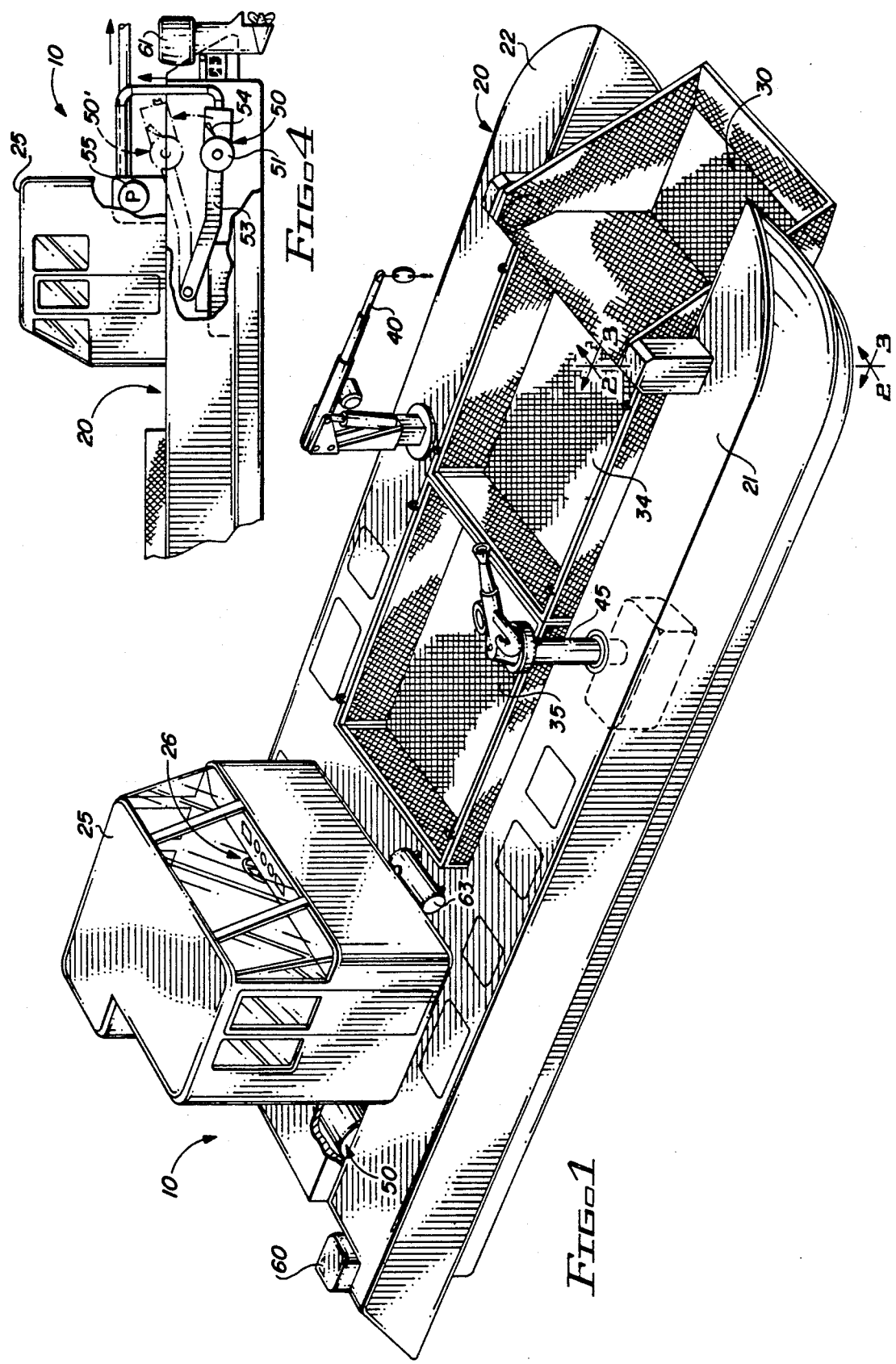
FIG. 1 is a perspective view of the multi-purpose environmental work vessel.

Referring to FIGS. 1 and 6, the work vessel 10 further includes a pilot house 25 mounted upon the deck area 24, containing navigation means 26 therein, and is powered by a pair of outboard motors 60 and 61 mounted at the rear of the hull 20. Mounted between the pontoons 21 and 22 in front of the pilot house 25 are a pair of trash containers 34 and 35. The trash containers 34 and 35 include a mesh construction to allow water to pass therethrough, thereby reducing the weight of the trash. The trash containers 34 and 35 are divided into an active trash container 34 positioned closer to the front end of the hull 20, and an inactive trash container 35 positioned behind the active trash container 30.

Mounted on the hull 20 are an inboard crane 40, a water monitor 45, and an air compressor 63. The air compressor 63 is positioned such that it may provide oil-free, non-contaminated air to a diver below the hull 20. The water monitor 45 is pivotally disposed atop a pontoon 21 and is capable of pumping water using a centrifugal pump, or spraying cleansing solution and fire dispersement foam from an onboard tank, thereby making it useful in boat-to-boat as well as boat-to-shore firefighting situations. The inboard crane 40, which is mounted on a pontoon 22 has a plurality of uses, one of which includes lifting the inactive trash container 35 such that the active trash container 34 may be slid rearward and replaced by the inactive trash container 35 at a forward end of the hull 20, as referenced in FIG. 5

Figure 2:
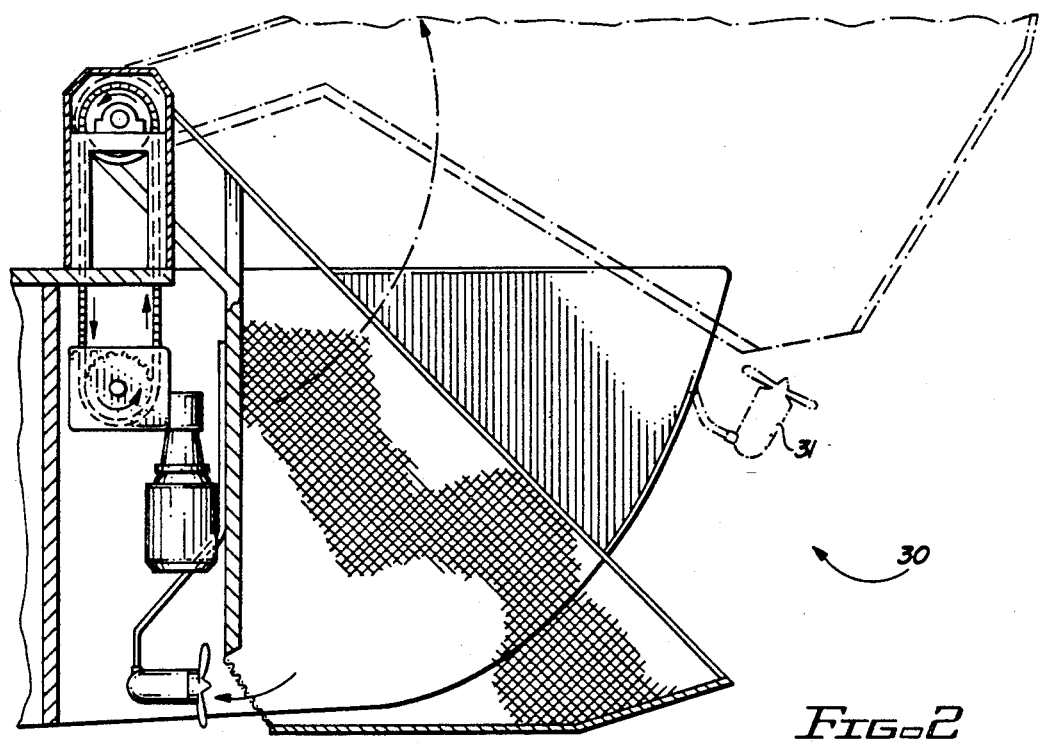
FIG. 2 is a detailed side view of the retractable trash scoop.
Figure 3:
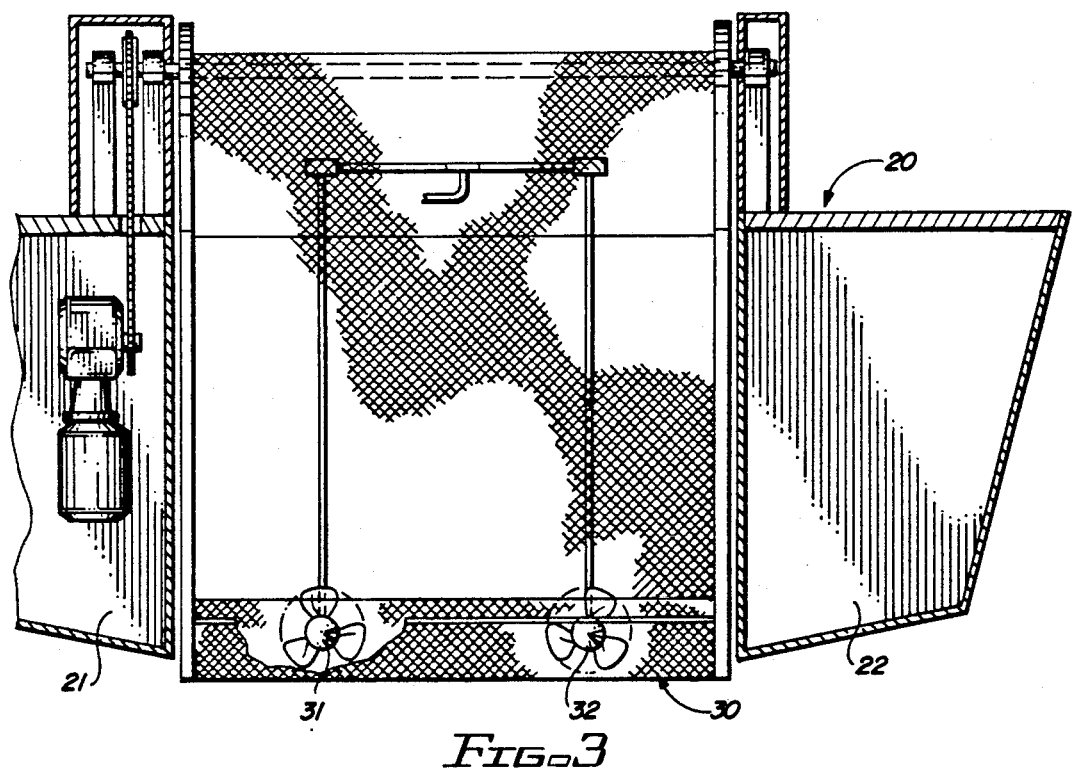
FIG. 3 is a detailed top view of the retractable trash scoop.

Positioned at the forward end of the hull 20 in front of the active trash container 34, and between the pontoons 21 and 22 is a pivotally mounted trash scoop 30. The trash scoop 30, as best seen in FIGS. 2, 3 and 5, is movable between an active position within the water such that debris may be scooped therein as the vessel moves in a forward direction, and a retracted position 30' to permit dumping of trash within the trash scoop 30 into the active trash container 34. Located at a rear portion of the trash scoop 30 are a pair of flow inducer propellers 31 and 32. The flow inducer propellers 31 and 32 are structured and disposed to suck water, and accordingly debris, into the trash scoop 30, thereby maximizing the trash intake of the trash scoop 30. Also, the trash scoop 30 is structured so as to allow the passage of water therethrough such that only debris is held therein.

Located behind the pilot house 25 and mounted between the pontoons 21 and 22 is a skimming drum-type oil skimmer 50, best seen in FIGS. 4, 6, and 7. The skimming drum-type oil skimmer 50 may also be in a retracted position 50', shown in FIG. 4, when not in use. The oil skimmer 50 includes primarily a pair of spinning drums 51 and 52 which are covered with an oleophilic material which selectively rejects water and holds oil. The drums 51 and 52 are thereafter passed over a scraper blade 54 such that oil held by the drums 51 and 52 may be removed for elimination. The spinning drums 51 and 52, and scraper blade 54, are supportably held by a retractable frame 53. The retractable frame 53 is connected to a disposal pump 55 which removes oil scraped from the spinning drums 51 and 52, and pumps it to oil holding means 57. In a preferred embodiment, the oil holding means 57 may be an inflatable storage bladder 58 floating near the vessel 10, as shown in FIG. 8. Alternatively, the oil may be pumped to a specific oil storage vessel.

Referring to FIG. 9, positioned in place of an inactive trash container 35, removable dredge means 70 may be mounted. The removable dredge means 70, include a dredge head 73 which can be maneuvered by the inboard crane 40. Structured and disposed to pump debris collected by the dredge head 73 through an elongate tube 72 and into the active trash container 34, is the disposal pump 55.

The specific features and layouts disclosed herein are the preferred embodiment of the applicant's invention at the present time, and accordingly, variations consistent with the intent of the applicant and within the doctrine of equivalents are included.

Now that the invention has been described,

What is claimed is:

1. A multi-purpose, environmental work vessel comprising:
   a catamaran-type hull being substantially lightweight and capable of allowing the vessel to run at high speeds and at a substantially low draft,
   said hull including a pair of elongate pontoons connected to one another, at a rear portion thereof, by a deck area,
   a trash scoop pivotally positioned between said pontoons at a forward end of said hull, said scoop being structured and disposed to allow the passage of water therethrough while trash is captured therein,
   at least one trash container,
   said trash scoop being further structured and disposed to retain large and small articles of floating debris and comprising means to dump and unload the debris into an adjacently positioned active one of said at least one trash container,
   said active trash container being removably positioned between said pontoons directly behind said trash scoop,
   suction dredging means for dredging a bottom surface of canals, waterways, and the like for debris,
   an inboard crane being centrally mounted on one of said pontoons,
   fire monitor means being centrally mounted on one of said pontoons to assist the putting out of fires on boats and waterfront facilities,
   oil spill cleanup means retractably mounted between said pontoons at a rear end of said hull, said spill cleanup means comprising means to skim oil from the water and pump said skimmed oil directly to an oil holding means, and
   propulsion means to move said hull through the water.

2. A vessel as recited in claim 1 wherein said at least one trash container is made of a sturdy mesh-type construction capable of holding a substantial weight and allowing the passage of water therethrough.

3. A vessel as recited in claim 2 wherein said trash scoop is of a generally triangular shape, and includes a pair of flow inducer propellers at a rear portion thereof to suck additional debris into said trash scoop.

4. A vessel as recited in claim 1 wherein said fire monitor means includes means to pump water using a centrifugal pump, and means for spraying cleansing solution and fire dispersant foam from an onboard tank.

5. A vessel as recited in claim 4 wherein said hull includes an air compressor means to pump oil-free air to a diver.

6. A vessel as recited in claim 5 wherein said hull includes a pilot house, having navigation controls therein on said deck area.

7. A vessel as recited in claim 6 wherein said propulsion means includes a pair of outboard motors mounted at the rear of said hull.

8. A vessel as recited in claim 7 wherein said oil cleanup means includes a spinning drum type oil skimmer having an oleophilic material on an exterior surface thereof to selectively retain oil and reject water.

9. A vessel as recited in claim 8 wherein said oil cleanup means further includes a scraper blade to remove the oil from said exterior surface of said drum, and direct it to a discharge pump which sends the oil to said oil holding means.

10. A vessel as recited in claim 9 wherein said oil holding means includes an inflatable storage bladder.

11. A vessel as recited in claim 9 wherein said oil holding means includes a storage boat.

12. A vessel as recited in claim 9 wherein there is a second one of said trash containers removably mounted between said pontoon behind said active trash container.

13. A vessel as recited in claim 12 further comprising means for switchably repositioning said active trash container and said second trash container with one another utilizing said crane.

14. A vessel as recited in claim 9 wherein said dredging means are removably mountable between said pontoon behind said active trash container.

15. A vessel as recited in claim 14 wherein said dredging means includes a vacuum-type dredge head connected by an elongate tube to said active trash container.

16. A vessel as recited in claim 15 wherein said dredge head includes a pump thereon to suck debris into said dredge head, and through said tube into said active trash container.

17. A vessel as recited in claim 16 further comprising means for maneuvering said dredge head by said crane.

* * * * *